United States Patent [19]

Salts

[11] Patent Number: 4,498,831
[45] Date of Patent: Feb. 12, 1985

[54] ARTICLE STACKING APPARATUS
[75] Inventor: Thomas R. Salts, Roanoke, Ill.
[73] Assignee: Besser Industries, Inc., Roanoke, Ill.
[21] Appl. No.: 489,227
[22] Filed: Apr. 27, 1983
[51] Int. Cl.³ .............................................. B65G 57/10
[52] U.S. Cl. ........................................ 414/46; 414/84;
414/85; 414/786
[58] Field of Search ..................... 414/36, 46, 82, 84,
414/85, 786

[56] References Cited

U.S. PATENT DOCUMENTS

| | | | |
|---|---|---|---|
| 2,981,420 | 4/1961 | Johanson | 414/85 |
| 3,247,981 | 4/1966 | Johnson | 414/82 X |
| 3,294,257 | 12/1966 | Davies et al. | 414/85 |
| 3,696,945 | 10/1972 | Bobolts | 414/84 X |
| 3,833,132 | 9/1974 | Alduk | 414/84 |
| 3,901,391 | 8/1975 | Carlson et al. | 414/84 X |
| 3,941,048 | 3/1976 | Oe et al. | 414/82 X |
| 4,018,031 | 4/1977 | Smaw | 414/46 X |

Primary Examiner—Leslie J. Paperner
Attorney, Agent, or Firm—Learman & McCulloch

[57] ABSTRACT

Apparatus for assembling articles into a multilayer stack wherein each layer consists of a plurality of articles, includes an improved form of stripping gate and clamping means for transversely compacting the individual layers. An improved control system automatically runs various drive motors selectively at fast or slow speeds to enable reduced cycle times to be achieved while movable members are moved at relatively slow speed when approaching a stop.

12 Claims, 10 Drawing Figures

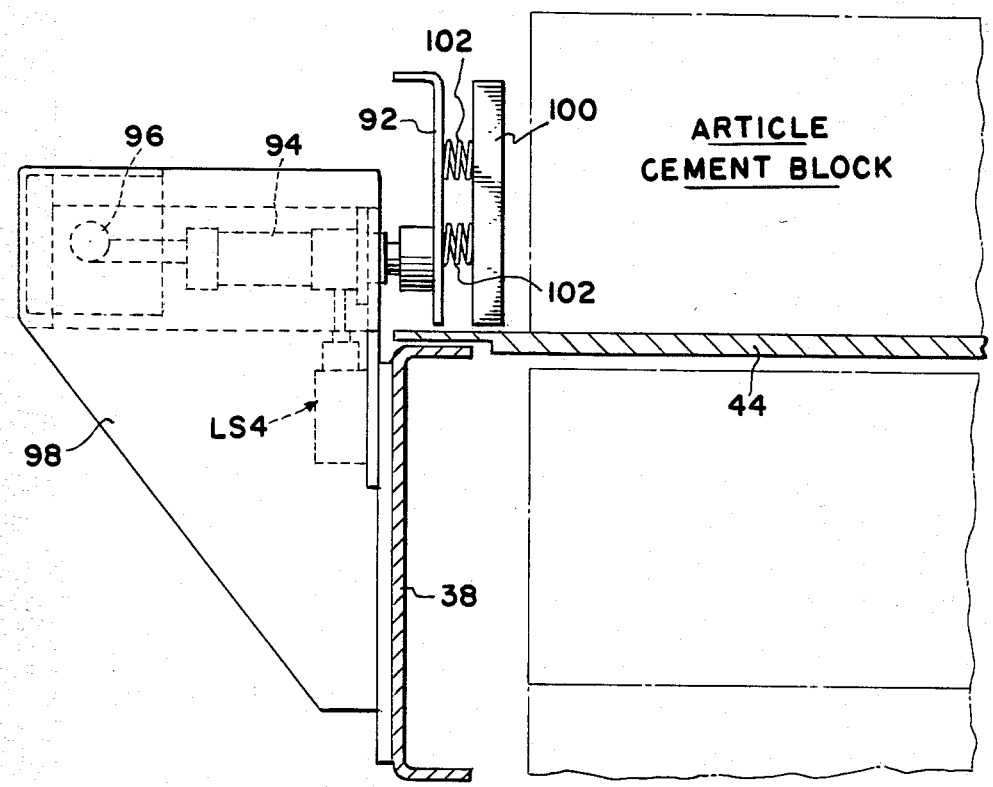

ARTICLE STACKING APPARATUS

BACKGROUND OF THE INVENTION

The present invention is directed to improvements in article handling apparatus employed to assemble a multilayer stack of articles in which the layers of the stack are made up of several individual articles arranged in a generally rectangular pattern. Davies et al U.S. Pat. No. 3,294,257 is a prior art patent disclosing a machine of the type with which the present invention is concerned, namely one in which a layer of articles is formed on a transfer plate, after which the plate is elevated to the necessary height and advanced into overlying relationship with the uppermost layer then in the stack being assembled. Upon subsequent retraction of the plate, the layer of articles is stripped from the plate and deposited upon the top of the stack.

The present invention is especially directed to improvements over machines of the type disclosed in the above referred to U.S. Pat. No. 3,294,257; specifically in improvements relating to the structure of the elevating mechanism and gate employed in stripping the layers from the transfer plate, as well as improvements in the method of operation.

SUMMARY OF THE INVENTION

In accordance with the present invention, a fixed frame includes a stacking table whose stack supporting surface may be defined by a plurality of conveyor rollers which, in the present invention, are not required to be power driven. An elevating frame is mounted upon the fixed frame for vertical movement. Viewed from above, the elevating frame is of an open rectangular configuration having an opening slightly greater than twice as long as the stacking table and slightly wider than the stacking table so that one end of the elevating frame can be lowered past the stacking table with the elevating frame closely surrounding three sides of the rectangular stacking table. A transfer plate is slidably mounted upon the elevating frame for sliding movement longitudinally of the frame from one end to the other. When the elevator frame is in an elevated position relative to the stacking table, the transfer plate when at one end of the frame vertically overlies the entire stacking table. When the transfer plate is retracted to the opposite end of the elevator frame, the transfer plate is entirely clear of vertical alignment with the stacking table.

A gate or stripper plate is mounted upon the elevator frame for movement between a retracted position in which the gate is located below the path of movement of the transfer plate, and an elevated position in which the gate is located slightly above the path of movement of the transfer plate.

In operation, a layer of articles is formed upon the transfer plate with the plate retracted clear of the transfer table and the elevator frame at an elevation such that the transfer plate is substantially at the level of the stacking table. When the first layer of a stack is so assembled on the table, a control circuit is operated to elevate the plate a fixed distance to an elevation at which the path of movement of the plate is slightly above the surface of the stacking table. The plate is then driven forwardly at a relatively slow speed and during this relatively slow advance, the leading edge of the plate will engage a previously assembled stack located on the stacking table and push this previous stack clear of the stacking table as the first layer of the new stack is moved into position above the table. The gate is then actuated to its elevated position, and concurrently with the elevation of the gate to its stripping position, clamps mounted on opposite sides of the elevator frame may be moved into engagement with opposite sides of the layer of blocks supported upon the transfer plate to compact the layer transversely.

The transfer plate is then retracted from beneath the layer of articles, the elevated gate engaging the layer of articles to strip them from the transfer plate as the plate is retracted.

When the plate reaches its fully retracted position, the gate and clamps are restored to their retracted position, as the elevator is lowered to its original position to receive a second layer of articles.

The steps described above are cyclically repeated, however, during the transfer of the second and subsequent layers into position about the previously transferred layers, the plate is driven at a relatively high speed of advancement.

Other objects and features of the invention will become apparent by reference to the following specification and to the drawings.

IN THE DRAWINGS

FIG. 3A is a further enlarged cross-sectional view taken on the line 3a–3a of FIG. 3;

FIG. 6 is a cross-sectional view taken on the line 6—6 of FIG. 5;

FIG. 8 is a switch diagram helpful in understanding the operation of the control circuit.

Figure 1:
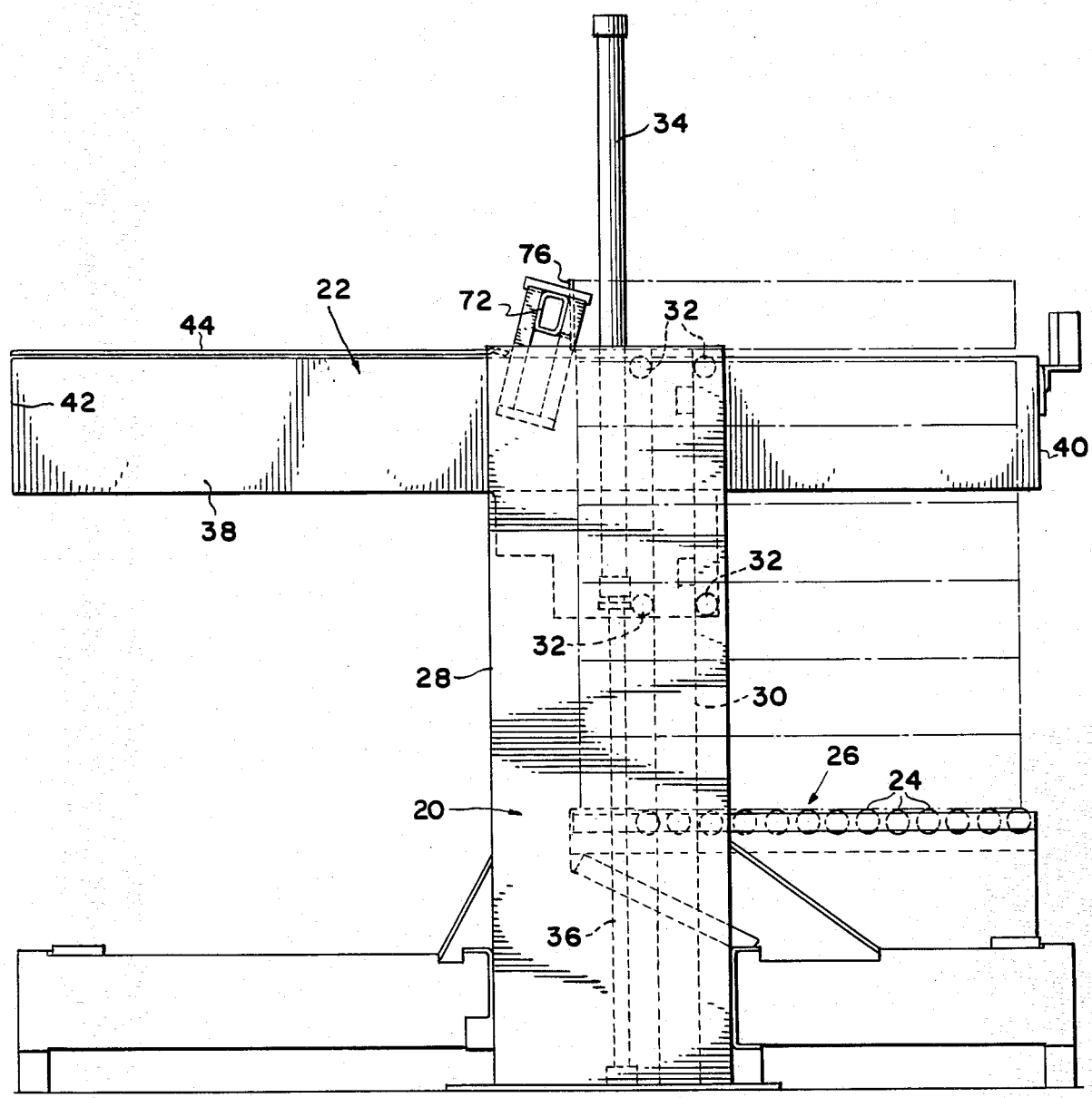
FIG. 1 is a schematic side elevational view of a stacking apparatus embodying the present invention, showing the elevator in an elevated position.

Referring first to FIG. 1, the major components of the machine include a fixed frame designated generally 20 and an elevating frame designated generally 22 which is shown at its maximum elevation in FIG. 1. At its forward end (right-hand end as viewed in FIG. 1), a plurality of conveyor rollers 24 rotatably journaled in fixed frame 20 constitute a stacking table upon which articles are stacked during the operation of the machine.

Overlapping the rearward or left-hand end of the stacking table, generally designated 26, are a pair of vertical posts 28 which constitute a portion of fixed frame 20 and project vertically upwardly at opposite sides of the machine. (See also FIG. 2) Fixedly mounted at the interior side of each of posts 28 is a vertically extending guide rail 30 whose opposite side edges are engaged by a series of rollers 32 rotatably mounted upon elevator frame 22 to guide the elevator frame in vertical movement relative to the fixed frame. Vertical movement of elevator frame 20 is accomplished by actuation of an elongate long stroke hydraulic motor 34 whose cylinder is fixedly mounted upon elevator frame 22 and whose piston rod 36 is fixedly secured to fixed frame 20.

Figure 2:
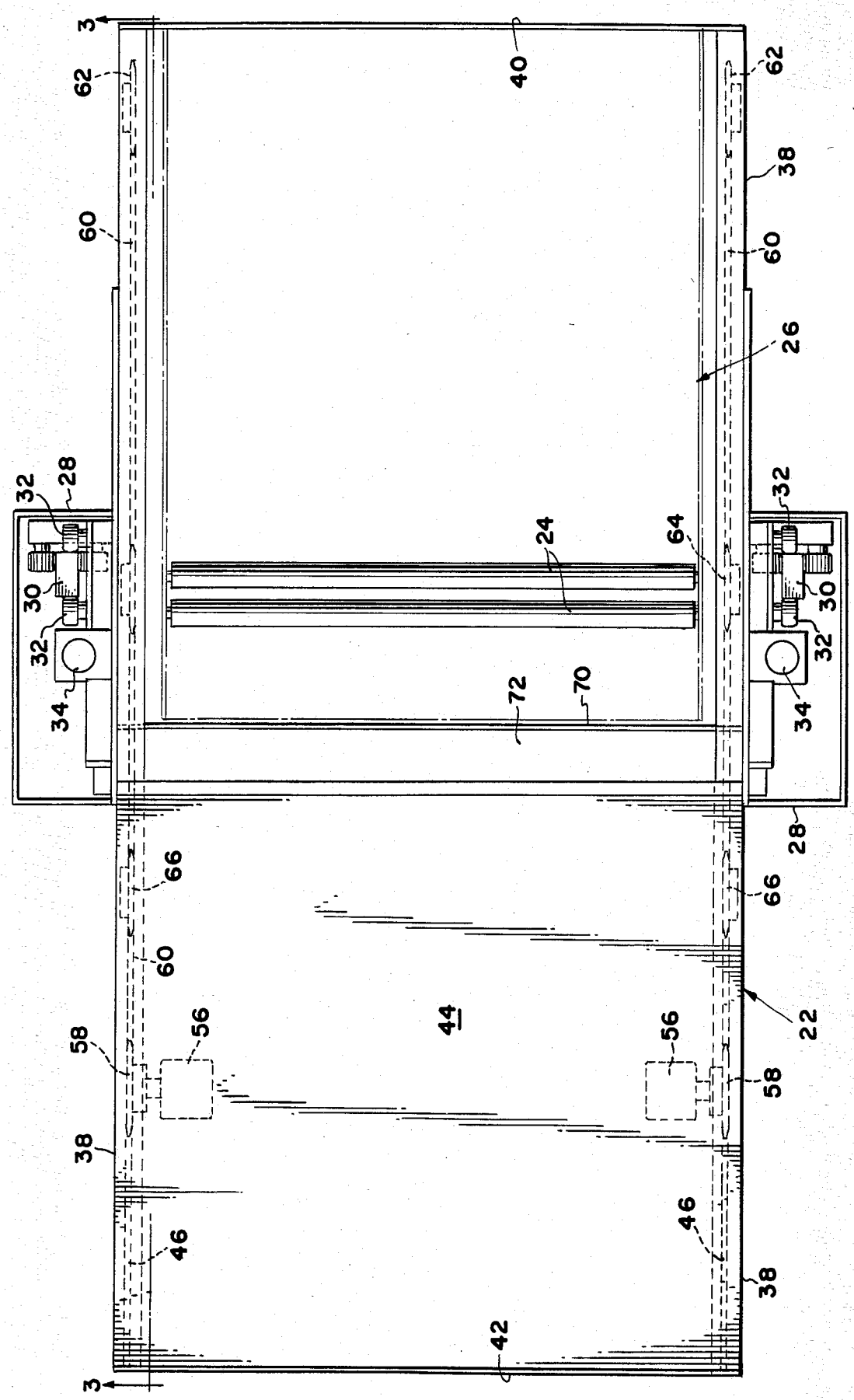
FIG. 2 is a schematic top plan view of the machine with certain parts of the fixed frame omitted or indicated in broken line.

Referring now particularly to FIG. 2, when viewed from above, it is seen that elevator frame 22 includes a pair of elongate longitudinally extending side frame members 38 which are rigidly connected at their opposite ends by a front cross frame member 40 and a rear cross frame member 42. The frame members 38, 40 and 42, when viewed from above as in FIG. 2 define an open rectangular frame which, with relationship to stacking table 26 shown in broken line in FIG. 2, is over twice as long and slightly wider than the rectangular stacking table 26. Elevator frame 22 is so located with respect to stacking table 26 that the frame can pass freely upwardly and downwardly past the stacking table with the table located adjacent the front (right) end of the elevator frame.

Figure 3:
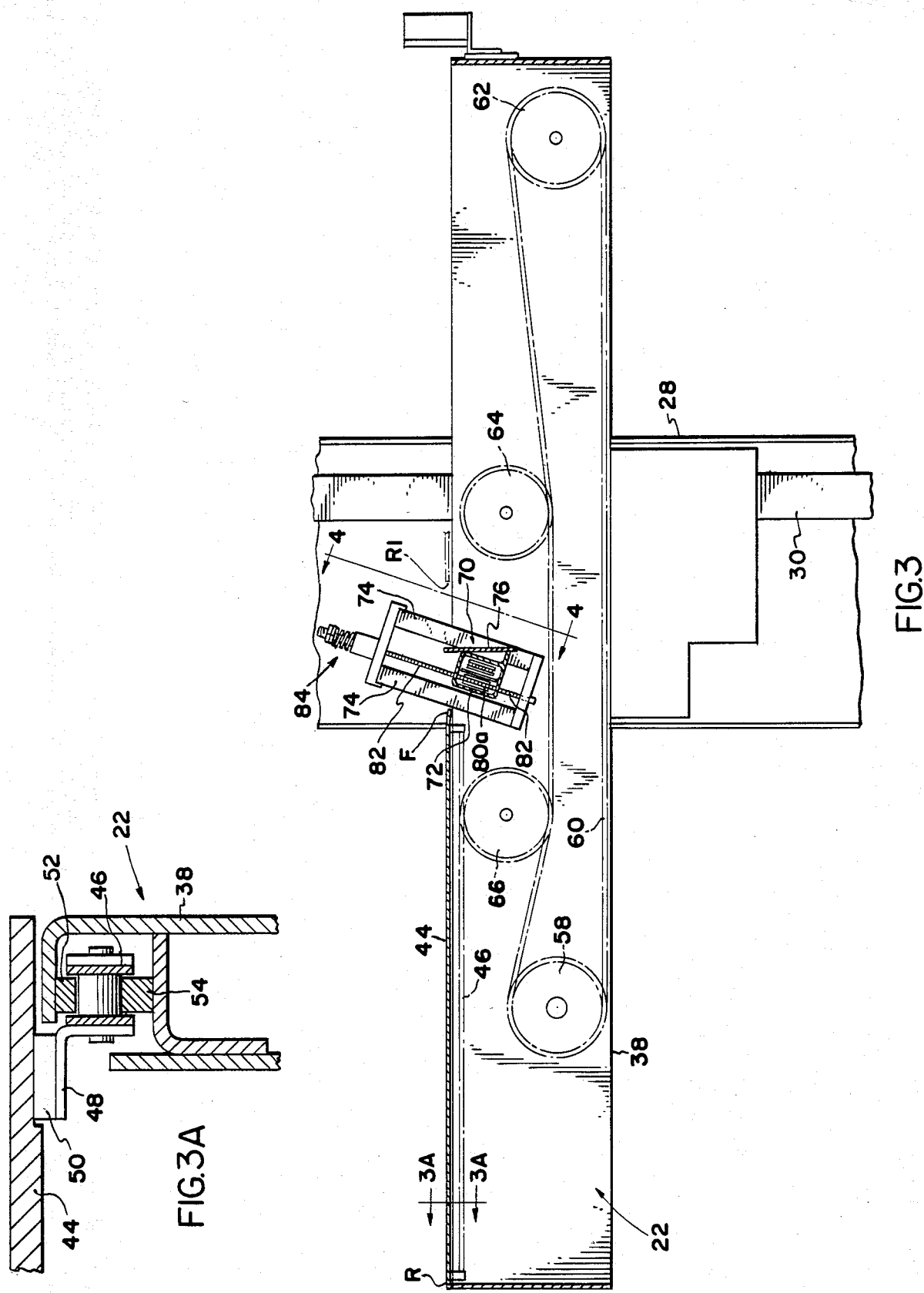
FIG. 3 is an enlarged schematic cross-sectional view taken on the line 3—3 of FIG. 2.

From FIGS. 2 and 3, it is seen that a rectangular transfer plate 44 is mounted upon elevator frame 22.

Referring particularly to FIG. 3A, extending along each of two opposed sides of plate 44, a roller chain 46 is fixedly mounted in spaced underlying relationship to plate 44 as by a series of brackets 48 and pads 50 (shown only in FIG. 3A). The chains 46 are fixedly guided in sliding movement relative to elevator frame 22 by upper and lower rails 52, 54 (FIG. 3A) which are fixedly mounted on side frame members 38 of elevator frame 22. Thus the transfer plate 44 can move in guided sliding movement longitudinally along frame 22 from the fully retracted position shown in FIGS. 2 and 3 to the opposite or forward end of frame 22, at which position the plate 44 would directly overlie stacking table 26. Drive motors 56, which preferably are reversible, variable speed motors, are employed to directly drive drive sprockets 58 (FIG. 3). An endless chain 60 is operatively trained around each drive sprocket 58 and an idler sprocket 62, the upper run of the chain being deflected downwardly by an idler sprocket 64 and the chain passing from sprocket 64 to a plate drive sprocket 66 which is meshed with the chain 46 attached to transfer plate 44. It is believed apparent that if sprocket 58 shown in FIG. 3 is driven by its motor 56 in a counterclockwise direction as viewed in FIG. 3, sprockets 66 and 64 will be driven in a clockwise direction to drive chain 46 to the right as viewed in FIG. 3. Opposite rotation of sprocket 58 will, of course, drive sprockets 66 and 64 in the opposite, chain return direction.

From FIG. 2, it is seen that while transfer plate 44 extends transversely across the entire width of the opening in the rectangular frame defined by members 38, 40 and 42, the dimension of transfer plate 44 longitudinally of the rectangular frame is somewhat less than one-half of the length. Referring to FIG. 3, when plate 44 is in the fully retracted position shown in FIG. 3, its front edge F is at the indicated location. When the plate 44 is at its fully extended or forward position, the rearward edge R of plate 44 is at the location indicated in broken line at R1 in FIG. 3. This arrangement provides a space through which a retractable gate or stripper plate designated generally 70 may be raised and lowered between the retracted position shown in FIG. 3 where the gate 70 is below the path of movement of transfer plate 44 and an elevated position in which the gate is elevated slightly above the path of movement of plate 44.

Gate 70 is a movable assembly which includes a box beam 72 whose opposite ends are slidably guided in a pair of parallel vertically inclined guide rails 74 fixedly mounted on the outer side of each of side frame members 38 of elevator frame 22. Box frame member 72 carries a fixedly mounted plate 76 which is horizontally elongated and mounted in a general vertical plane upon box frame member 72.

The gate is raised and lowered by a mechanism which includes a hydraulic motor designated generally 78 whose cylinder is fixedly mounted upon one elevator side frame member 38 and whose piston rod is coupled to one end of box beam 72. To assure equalization of movement of the opposite ends of box beam 72 by virtue of this unsymmetrical application of power, a chain and sprocket assembly is mounted within box beam 72.

Figure 4:
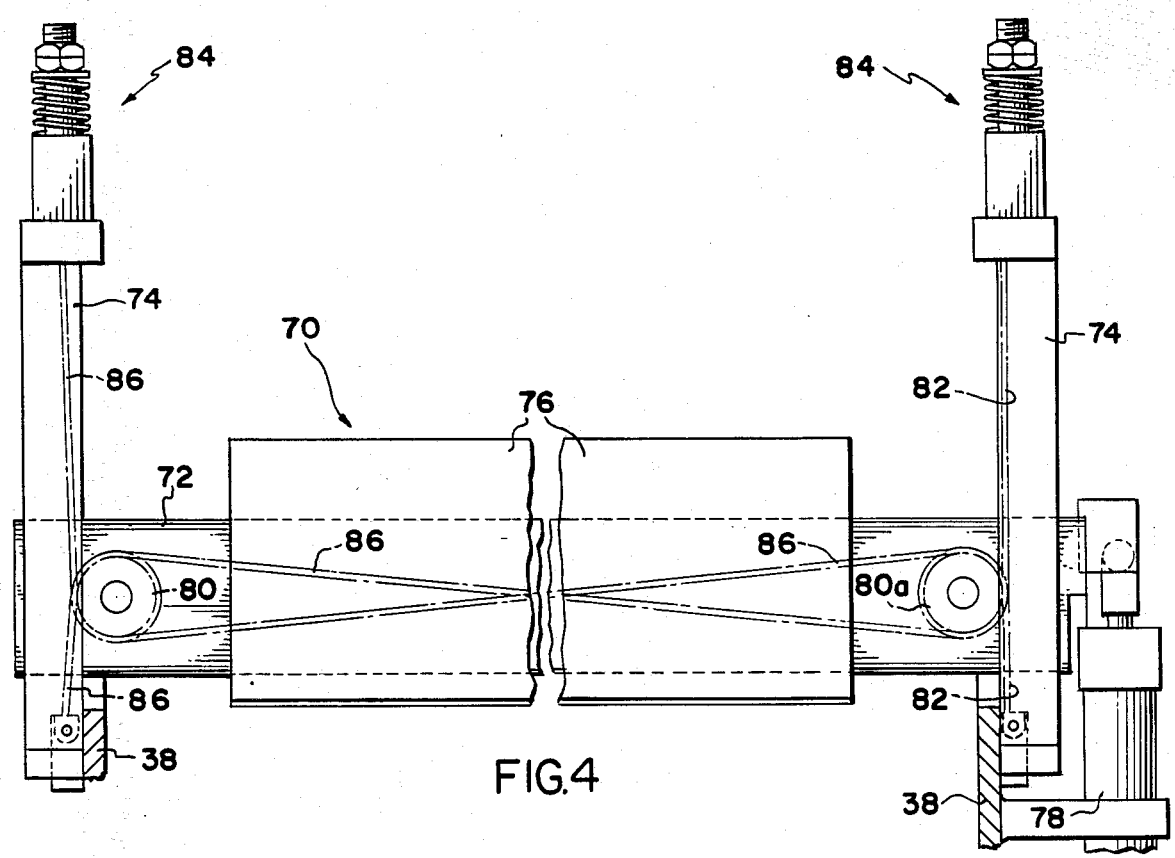
FIG. 4 is a schematic view taken approximately on the line 4—4 of FIG. 3 showing details of the gate construction.

The chain and sprocket mechanism includes two pairs of sprockets 80, each pair consisting of two coaxially rotatable sprockets mounted in side-by-side relationship. At that end of beam 72 to which the hydraulic motor is coupled, a first length of chain 82 is fixed at its lower end to the guide rail assembly 74 and extends vertically along the guide rail assembly, its upper end being coupled to a spring tensioning mechanism designated generally 84. The chain 82 is in mesh with one of the two sprockets which constitute the right-hand pair (80a) of sprockets as viewed in FIG. 4.

A second chain 86 is fixed at its lower end to the opposite guide rail assembly 74 and from this point is trained about a first of the left-hand pair of sprockets 80 as viewed in FIG. 3, then about that sprocket of the pair 80a which is not in mesh with vertical chain 82, thence back to the other of the left-hand pair of sprockets 80 and upwardly to have its upper end coupled to a spring tensioning mechanism designated generally 84. The crossed relationship of the chain 86 indicated in FIG. 4 maintains the opposite ends of beam 72 at the same level during movement of the beam.

Figure 5:
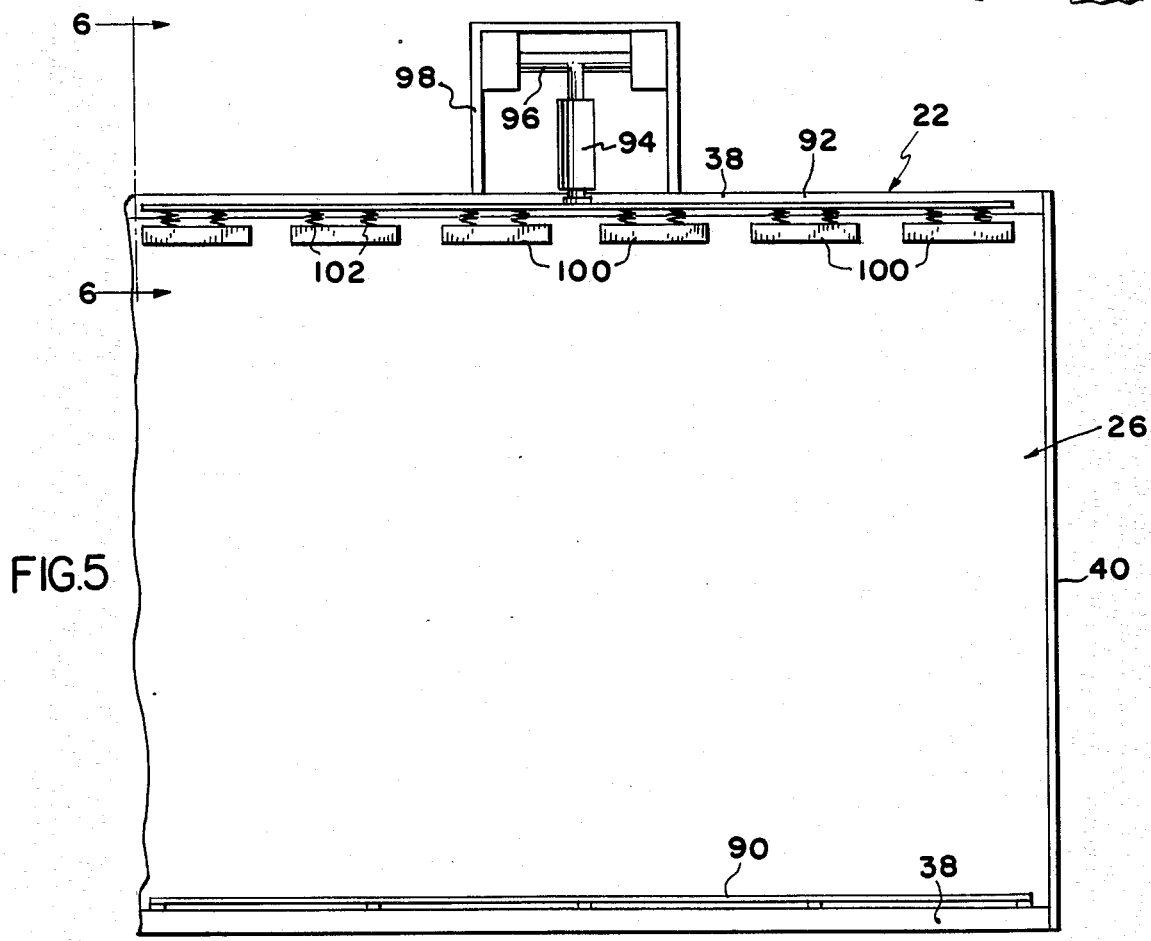
FIG. 5 is a schematic top plan view of the forward end of the elevator frame showing a clamping assembly mounted thereon.

Referring now to FIGS. 5 and 6, there is disclosed in these figures a clamping arrangement which may be considered an optional feature, but which is useful in most applications. During the retracting movement of the plate 44 to strip a layer of articles from the retracting plate, the layer of articles is compacted in the longitudinal direction by the frictional forces exerted by the plate in withdrawing from beneath the articles which are held against longitudinal movement with the plate by the elevated gate. In many applications it is desirable to assure that the layer also be compacted in the transverse direction, and this transverse compacting function is performed by the clamping arrangement of FIGS. 5 and 6.

Referring first to FIG. 5, at the forward end of elevator frame 22, a fixed clamping plate 90 is mounted to extend parallel to the associated side frame member 38 over a length and at a position corresponding to that of the associated side of the stack as located on stacking table 26. The fixed plate 90 is mounted slightly above the path of movement of plate 44 and hence will be in horizontal alignment with a layer of articles supported on the plate.

At the opposite side of elevator frame 22, a movable clamp plate 92 is mounted in opposition to plate 90 and is capable of being driven in movement toward or away from fixed plate 90 by means of a hydraulic motor 94 whose piston rod is coupled to plate 92 and whose cylinder is mounted for movement about a horizontal pivot axis 96 upon a mounting bracket 98 fixedly mounted upon side frame member 38. A plurality of individual article engaging plates 100 are carried on the article facing side of movable plate 92 by sets of compression springs 102 so that the plates 100 can, as required, move independently of each other relative to plate 92.

In some environments, the articles which are being compacted between plates 90 and 92 may not all be of the exact same dimensions, that is, one transversely extending row of articles may be of a different length than the next adjacent row. The independent spring mounted plates 100 thus assure that all rows are compacted.

To assure an automatic release of the clamps as the clamped articles become supported upon the next lower layer in the stack, a limit switch LS4 is mounted on the frame as shown in FIG. 6 with its striker engaged with the cylinder of hydraulic motor 94 which, as noted above, is hingedly mounted on the frame as by a hinge pin 96. When the motor 94 is in a horizontal position, the striker of limit switch LS4 is depressed.

If the clamp is engaged with articles and the elevator begins to move down, when the articles come to rest on top of the stack further downward movement of the elevator frame would cause motor 94 to swing upwardly, in a clockwise direction about pivot 96 as viewed in FIG. 6, thus causing that end of motor 94 engaged with the limit switch striker to elevate. Opening of this limit switch by the consequent elevation of its striker is employed to automatically release the clamp.

THE OPERATION

Operation of the apparatus described above will be set forth in connection with the electrical control circuit of FIG. 8. To briefly describe the circuit, control of the operation of the various hydraulic and electric motors employed to drive the elevator, transfer plate and gates is by means of a series of solenoids SO1-SO10. With respect to the operation of the various hydraulic motors involved, the solenoids may be employed, in a well-known manner, to actuate four-way reversing valves connected in a well-known manner to the various motors to cause the motors to stroke in or out as the appropriate valve is actuated. Similarly, in the case of the electric motors employed to drive the transfer plate, the solenoids may be employed to establish various switching connections for appropriate operation of the motor. In that the valving and switching connections controlled by the solenoids are well understood by those skilled in the art, the hydraulic and electric motor control circuits have not been shown, and the function of each solenoid, when energized, has been noted upon the drawing adjacent the solenoid. When both "FAST" and "SLO" solenoids of one element are simultaneously energized, the "FAST" solenoid overrides the action of the "SLO" solenoid and the associated element will be driven at its fast speed whenever the "FAST" solenoid is energized.

The heart of the electrical control circuit is represented by two rotary stepping switches SS1 and SS2 which, dependent upon the rotary position of the switch, open and close various load switch contacts designated S1, S2, etc. in accordance with the table of FIG. 8. Various timing and control relays are also employed and will be referred to below.

Because a somewhat different control sequence is employed for the transfer of the initial layer of a stack to the stacking table, stepping switch SS1 is employed to control the transfer of the first layer, while transfer of subsequent layers is controlled by stepping switch SS2.

As a starting point in the description of the operation, it will be assumed that a completed stack of articles is located upon stacking table 26 and the first layer of the next to be assembled stack has been assembled upon transfer plate 44 with plate 44 in its retracted (FIGS. 2 and 3) position and elevator frame 22 at its lowermost position, at which transfer plate 44 is at the same level as the top of stacking table 26.

Figure 7A:
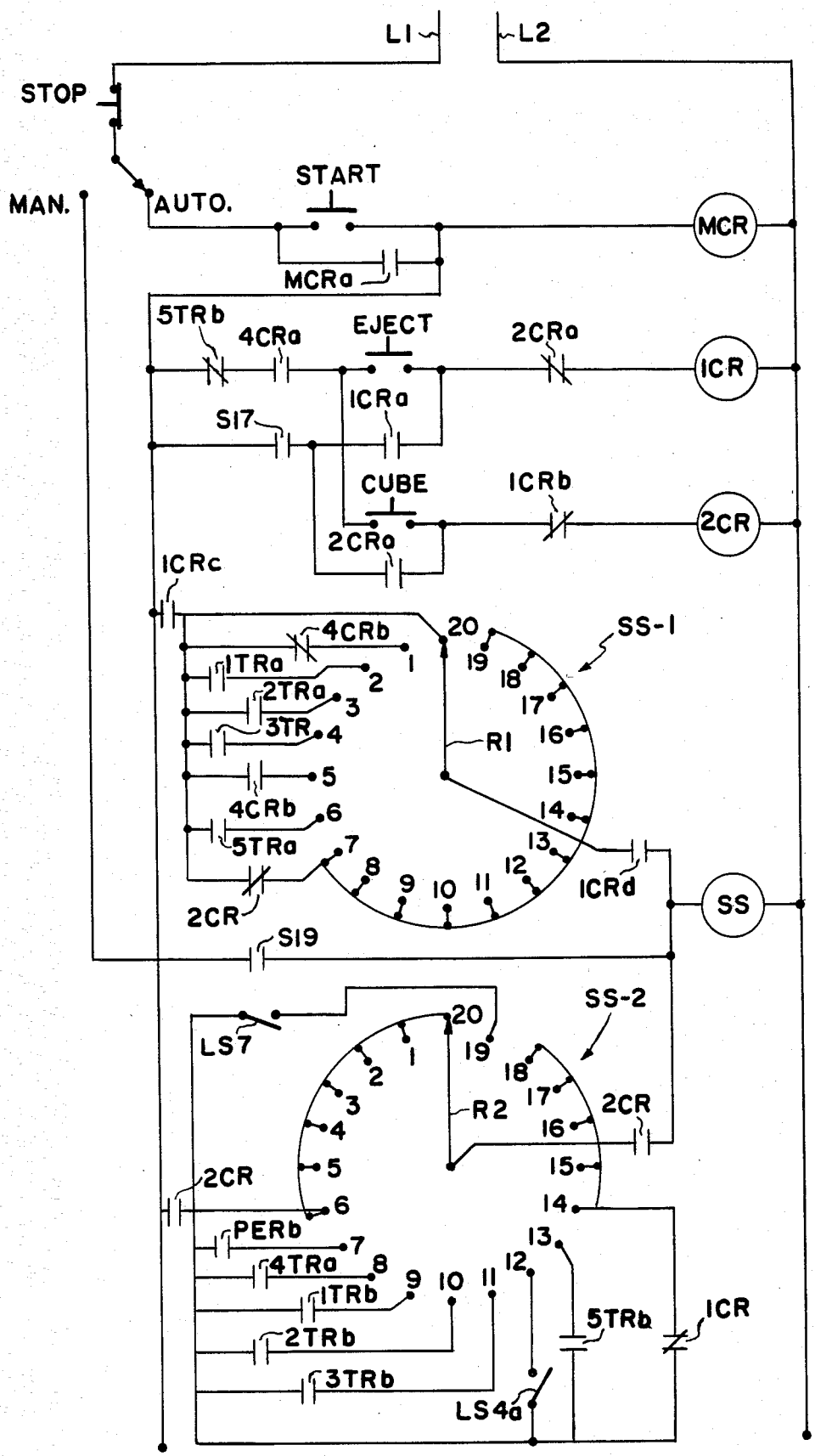
FIG. 7A is a schematic line diagram of a portion of an electrical control circuit for the machine.
Figure 7B:
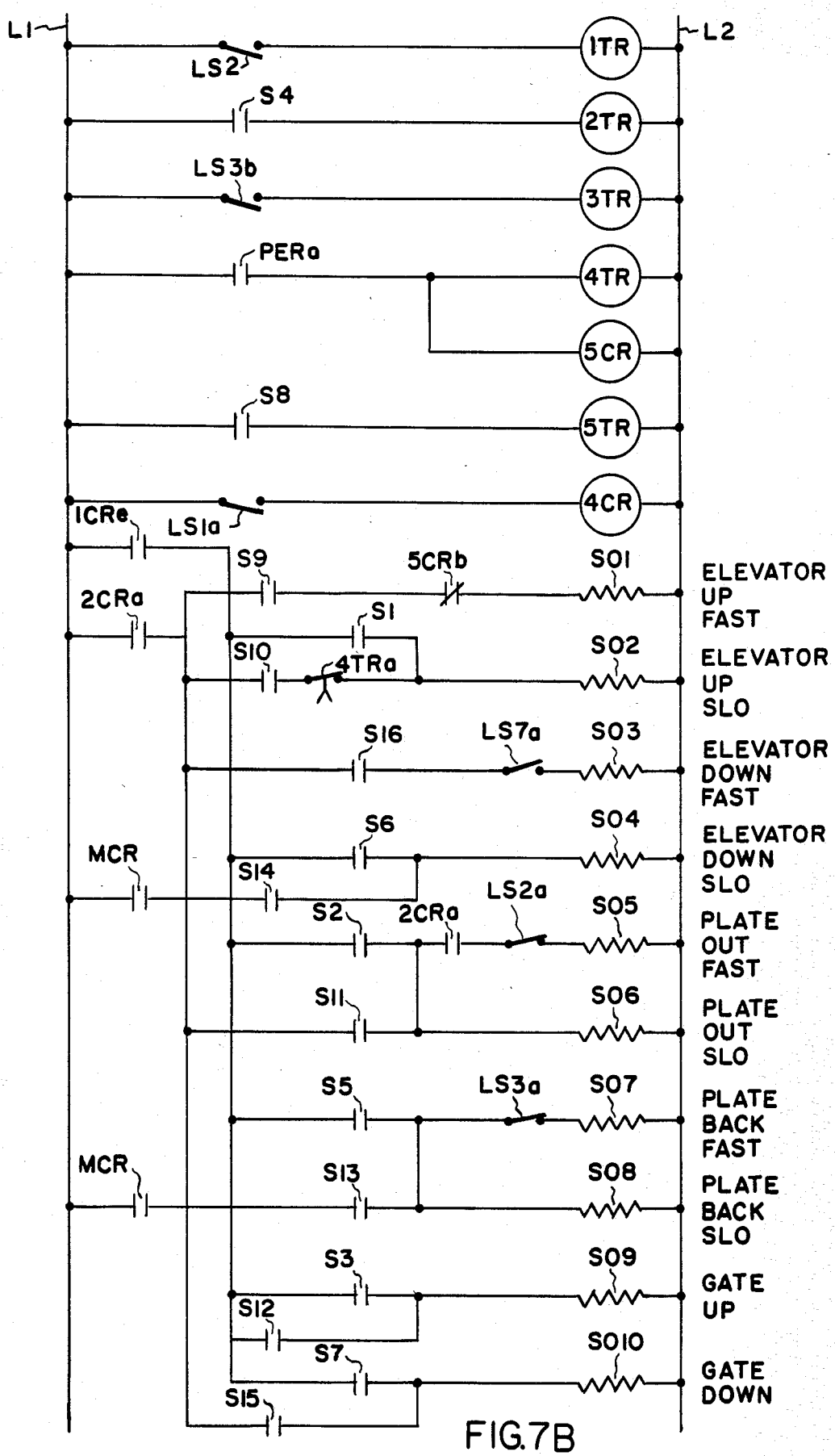
FIG. 7B is a schematic line diagram illustrating another portion of the control circuit.

Referring now to the electrical schematic of FIG. 7, depression of the start button (near the top of the diagram) energizes a master control relay MCR which, immediately upon energization, locks itself in via contacts MCRa. In order to initiate the transfer of the first layer to the next to be assembled stack to the stacking table and to simultaneously eject the completed stack from the stacking table, the operator momentarily depresses the EJECT button to energize relay 1CR via normal closed contacts 2CRa and contacts 4CRa. Contacts 4CRa are closed at this time because the elevator frame is at its extreme lowered position and in this position holds closed the contacts of a limit switch LS1a which energizes relay 4CR.

Limit switch LS1a is held closed by the elevator when the elevator is at its extreme lower position or within a very short distance of this position. LS1a is so arranged that it will open when the elevator has moved upwardly from its extreme lower position by a distance just sufficient to elevate the path of movement of the transfer plate to a location at which the plate will just clear the top of stacking table 26. When the elevator reaches this latter position, limit switch contacts LS1a open to deenergize relay 4CR and thus open contacts 4CRa.

However, before this occurs, relay 1CR is locked in via its own contacts 1CRa which are closed when the relay is energized, and normally closed load switch contacts S17. Energization of relay 1CR also opens normally closed contacts 1CRb to prevent simultaneous energization of both relays 1CR and 2CR. Energization of relay 1CR also closes contacts 1CRc and 1CRd to thereby energize the stepping switch drive motor SS which promptly drives the stepping switch rotors R1 and R2 of the two stepping switches from their No. 20 position shown in the drawings to their No. 1 position.

The transfer of the first layer of a stack is entirely under the control of stepping switch SS1. When rotor R1 of stepping switch SS1 is advanced to its No. 1 position, the stepping switch, as seen from the load switch diagram of FIG. 8, closes load switch contacts S1.

Closure of contacts S1 energizes the ELEVATOR UP SLO solenoid SO2 via contacts 1CRe (closed because relay 1CR is energized). Energization of the solenoid SO2 causes elevating frame 22 to be driven upwardly at a very slow rate, and this upward movement continues until limit switch contacts LS1a open, as described above, to thereby deenergize relay 4CR. This stops further movement of the elevator by permitting contacts 4CRb to return to their normal closed position upon the deenergization of relay 4CR, closure of contacts 4CRb again energizing the stepping switch motor SS to advance both rotors R1 and R2 to their number two positions.

With stepping switch SS1 at its number two position, load switch contacts S2 are closed. Closure of contacts S2 energizes solenoid SO6 which is the PLATE OUT SLO solenoid.

Plate 44, with the assembled layer supported on it then begins to move at a slow rate from its fully retracted position, and as it does so the front edge of the plate engages the lower layer of the previously assembled stack and pushes this stack from the stacking table as the plate carries the first layer of the next stack out over the table. As the plate begins to approach its fully extended position, it engages and closes a set of limit switch contacts LS2a which energize a timing relay 1TR. A predetermined time after relay 1TR is energized, it functions to close contacts 1TRa connected in series with position 2 of stepping switch SS1, thereby again energizing the stepping switch drive motor SS to advance the rotors R1 and R2 from their number 2 position to their number 3 position.

This advance opens the contacts of load switch S2, thereby deenergizing the PLATE OUT SLO solenoid to stop forward movement of the plate, and arrival of the rotor at the number 3 position closes load switch contacts S3 and S4. Closure of contacts S3 energizes solenoid SO9, which is the GATE UP solenoid and the gate is raised from its retracted position to its operating elevated position.

Closure of load switch contacts S4 energizes a second timing relay TR which, after a predetermined time delay sufficient for the gate to be fully actuated completes a circuit to the number 3 selector switch position of switch SS1 via contacts 2TRa to cause the rotors to advance to their respective positions 4.

With switch SS1 in its number 4 position, contacts S3 remain closed, contacts S4 are opened and contacts S5 are closed. Closure of contacts S5 energizes relay SO7, which is the PLATE BACK FAST solenoid. Limit switch contacts LS3a, connected in series with solenoid SO7, are normally closed contacts which are opened by the plate as it approaches its fully retracted position. Energized simultaneously with solenoid SO7 is solenoid SO8, which is the PLATE BACK SLO solenoid which takes over upon opening contacts LS3a and drives the plate through the final approach to its fully retracted position at a slow rate.

When contacts LS3a are opened by the approach of the plate to its retracted position, its companion contacts LS3b are closed, thereby energizing a timing relay 3TR which, after a predetermined interval sufficient for the plate to arrive at its fully retracted position, close contacts 3TRa to drive the stepping switch rotors from their position 4 to their position 5.

With the rotor R1 at its position 5, load switch contacts S3 and S6 are closed. Closure of load switch S6 energizes solenoid SO4, the ELEVATOR DOWN SLO solenoid, thus lowering the elevator slowly back toward its fully lowered position.

It should be noted that during the last three steps, load switch S3 has remained closed, thus maintaining the gate in its elevated position and the clamps at their clamping position in those cases where clamps are employed. When the elevator returns to its fully lowered position, contacts LS1a are again closed to energize relay 4CR, and thus contacts 4CRb to advance the stepping switch rotors to their number 6 position. When rotor R1 is in its number 6 position, load switch contacts 7 and 8 are closed (all others are open). Closure of load switch contacts S7 energizes solenoid SO10, the GATE DOWN solenoid. Closure of contacts S8 energizes still a further timing relay, 5TR which, after a predetermined time interval closes contacts 5TRa to advance the selector switch rotors to their respective number 7 positions. Energization of relay 5TRa also opens a set of normally closed contacts 5TRb after the predetermined time interval, thus deenergizing relay 1CR. Closure of contacts 5TRa, connected to stepping switch SS1, advances the stepping switch rotors to their respective number 7 positions, in which load switch contacts S8 are opened, deenergizing relay 5TR and restoring contacts 5TRb to their original normal closed positions.

This completes the entire transfer cycle of the first layer of the stack. Both stepping switch rotors are in their respective number 7 positions, the elevator is in its lowered position, the transfer plate is in its fully retracted position and the gate is likewise in its retracted position.

Upon assembly of the next subsequent layer upon the plate, to initiate the transfer cycle the operator depresses the CUBE button which energizes control relay 2CR via normal closed contacts 5TRb, contacts 4CRa (closed because the elevator is at its lowered position), the momentarily depressed CUBE switch and normally closed contacts 1CRb. Energization of relay 2CR locks itself in via contacts 2CRa and normal closed load switch contact S17.

With the select stepping switches in their number 7 position, load switch contacts 9 and 10 are closed. Closure of contact S9 energizes solenoid SO1, the ELEVATOR UP FAST solenoid via contacts 2CRa, closed by energization of relay 2CR and normal closed contacts 5CRb. Closure of contacts S10 similarly energizes the ELEVATOR UP SLO solenoid SO2 via some normally closed timing relay contacts 4TRa. The elevator thus moves upwardly, and continues to move upwardly until a light beam projected from one side of the elevator clears the top of the previously transferred layer of stacking table 26, illuminating an opposed electric eye on the elevator as it does so. When the electric eye sees the beam, it closes a set of photoelectric relay contacts PER which, when closed energize relay 4TR and relay 5CR. When relay 5CR is energized, it opens contacts 5CRb immediately, thus deenergizing solenoid SO1. However, solenoid SO2, the ELEVATOR UP SLO solenoid, remains energized until contacts 4TRa open when relay 4TR times out after its energization. This stops further upward movement of the elevator.

Sensing of light beam by the electric eye also closes a set of contacts PERb connected in series with position 7 of stepping switch SS2 to advance the rotor to position 8, at which position load switch S9 is opened while load switch S10 remains closed. The rotor remains at position 8 until relay 4TR times out, thereby closing contacts 4TRa to advance the rotor to position 9. At position 9, only load switch contacts S11 are closed, closure of these contacts energizing both the PLATE OUT FAST and PLATE OUT SLO solenoids. This causes the plate to be driven out fast into overlying relationship with the previously transferred layer until contacts LS2a are opened as the plate approaches its fully extended position. When contacts LS2a open, the PLATE OUT SLO solenoid SO6 takes over. Simultaneously with the opening of contacts LS2b, contacts LS2a are closed, energizing timing relay 1TR which after its preset interval of energization occurs closes contacts 1TRb to advance the rotors to their positions 10.

In position 10, load switch contacts S4 and S12 are closed, contact S4 energizing timing relay 2TR and contact S12 energizing the GATE UP solenoid. After time sufficient for the gate, and the clamps to reach their extended position, relay 2TR times out, closing contacts 2TR*b* connected to the number 10 position of stepping switch S2 to thereby advance the switch rotor to its number 11 position.

At position 11, load switch contacts 12 and 13 are closed—contacts S12 maintaining the GATE UP and contacts S13 energizing the plate BACK SLO and plate BACK FAST solenoids SO7 controls until the plate begins to approach its fully retracted position, at which time contacts LS3*a* are opened and solenoid SO8 takes over. Opening of contacts LS3*a* occurs simultaneously with the closure of contacts LS3*b* which actuates that timing relay 3TR to initiate a time closing of contacts 3TR*b* to advance the stepping switch rotor to its number 12 position.

With the rotor at position 12, load switch contacts S12 and S14 are closed, contact S14 energizing the ELEVATOR DOWN SLO solenoid. The elevator begins to lower and as it does, the clamps engaged at this time, with the last deposited layer tilt the clamping cylinder upwardly as described above, thereby actuating limit switch LS4 to close contacts LS4*a* when the weight of the layer is transferred to the stack, thereby releasing the clamps as described above. Closure of contacts LS4*a* actuate the rotor to position 13, in which load switch contacts S8 and S15 are closed.

Closure of contacts S8 energizes relay 5TR, closure of contacts S15 energizes the GATE DOWN solenoid SO10 to retract the gate, after a time interval sufficient to accomplish this purpose, the contacts 5TR*b* of the relay close to complete a circuit to position 13 of the stepping switch, thus stepping the rotor on to position 14. At position 14, load switch contacts S14 and S16 are closed, contacts C16 energizing the ELEVATOR DOWN FAST solenoid SO3 while contacts S14 energize the ELEVATOR DOWN SLO solenoid SO4. The elevator lowers under the control of solenoid SO3 until it begins to approach its lower end limit, at which time contacts LS7*a* open to deenergize SO3 and transfer control of the elevator to the slow relay SO4. While this is occurring, the rotors of the stepping switch continue to advance to position 20, at which time load switch S17 is opened, cutting the lock-in circuit to relay 2CR to signal the conclusion of the cycle.

Subsequent layers may be stacked by initiating the cycle by pressing the CUBE button as described above.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. In an apparatus for stacking successive layers of articles into a multilayer stack including a fixed frame, a horizontal elongate rectangular elevator frame having a length greater than twice its width mounted on said fixed frame, first drive means for driving said elevator frame in vertical movement on said fixed frame from and to a lowered rest position, a horizontally disposed transfer plate mounted on said elevator frame for forward and rearward movement longitudinally upon said elevator frame between a retracted position at the rearward end of said elevator frame and an extended position at the forward end of said elevator frame, second drive means for driving said plate in movement between said retracted and extended positions, stripper means mounted on said elevator frame operable in a projected position to strip a layer of articles from said plate upon rearward movement of said plate from said extended position to said retracted position and operable in an inactive position to accommodate unobstructed movement of a layer of articles carried on said plate, third drive means for moving said stripper means between said projected position and said inactive position, and a stacking table on said frame having a stacking surface adapted to support a stack of articles located at substantially the level of said plate when said elevator frame is at its rest position, said stacking surface being located to underlie said plate when said elevator frame is elevated from said rest position and said plate is in its extended position; the improvement wherein said plate is of a width substantially the same as the width of said elevator frame and is of a length less than half of that of said elevator frame, and said stripper means comprises a stripper member extending transversely across said elevator frame generally midway of the length thereof, said stripper member being disposed below the path of movement of said plate when said stripper means is in its inactive position and being located slightly above the path of movement of said plate when said stripper means is in its projected position, and control means is provided operable when a first stack of articles has been assembled upon said stacking surface and the first layer of a next stack has been assembled upon said plate with said elevator in its rest position, said plate in its retracted position and said stripper means in its inactive position, to operate said first, second and third drive means in a cycle wherein:

(1) said elevator frame is elevated to a position wherein the path of movement of said plate is located slightly above said stacking surface, (2) said plate is driven forwardly to its extended position at a relatively slow speed to engage and push said first stack forwardly from said stacking surface as said first layer of said next stack is carried by said plate into overlying relationship to said stacking surface, (3) said stripper means is driven to its projected position subsequent to the arrival of said plate at its extended position, (4) said plate is driven toward its retracted position at a relatively high speed until it approaches its retracted position and is then driven at said relatively slow speed during the final portion of movement to its retracted position and (5) said elevator and stripper means are restored to their respective rest and inactive positions.

2. The invention defined in claim 1 wherein said control means further comprises means operable upon the conclusion of step 5 and the assembly of a subsequent layer of articles upon said transfer plate to operate said first, second and third drive means in a cycle wherein:

(6) said elevator frame is elevated to an elevated position wherein the path of movement of said plate is located slightly above the upper surface of said first layer, (7) said plate is driven forwardly toward its extended position at a relatively high speed until it approaches its extended position and is then driven at said relatively slow speed during the final portion of movement to its extended position, (8) said stripper means is driven to its projected position subsequent to the arrival of said plate at its extended position, (9) said plate is driven toward its retracted position at a relatively high speed until it approaches its retracted position and is then driven at said relatively slow speed during the final portion of movement to its retracted position and,

(10) said elevator and stripper means are restored to their respective rest and inactive positions.

3. The invention defined in claim 2 wherein said first drive means drives said elevator frame at a relatively slow speed in steps 1 and 5 and at a relatively high speed in steps 6 and 10 until it approaches its elevated (step 6) or rest (step 10) position and is driven at said relatively slow speed during the final portion of movement to the respective last mentioned positions.

4. The invention defined in claim 3 wherein said apparatus further comprises releasable clamp means on said elevator frame actuable to transversely compact a layer of articles supported on said plate when said plate is in its extended position, and means in said control means for actuating said clamp means in step 8 and for releasing said clamp means in step 10 upon a predetermined lowering movement of said elevator frame.

5. In an apparatus for stacking successive layers of articles into a multilayer stack including a fixed frame, a horizontal elongate elevator frame mounted on said fixed frame, first drive means for driving said elevator frame in vertical movement on said fixed frame from and to a lowered position, a horizontally disposed transfer plate mounted on said elevator frame for forward and rearward movement longitudinally upon said elevator frame between a retracted position at the rearward end of said elevator frame and an extended position at the forward end of said elevator frame, second drive means for driving said plate in a path of movement between said retracted and extended positions, a stripper member mounted on said elevator frame operable in a projected position to strip a layer of articles from said plate upon rearward movement of said plate from said extended position to said retracted position and operable in an inactive position to accommodate unobstructed movement of a layer of articles carried on said plate, third drive means for moving said stripper member between said projected position and said inactive position, and a stacking table on said frame having a stacking surface adapted to support a stack of articles located at substantially the level of said plate when said elevator frame is at its lowered position, said stacking surface being located to underlie said plate when said elevator frame is in said extended position; the improvement comprising a clamp means assembly with clamps, mounted upon opposed longitudinal sides of said elevator frame at the sides of said path of movement for engagement with opposed sides of a layer of articles supported upon said plate when said plate is in its extended position, said assembly including means mounting at least one of said clamps for lateral movement into and out of engagement with the layer of articles and at least one of said clamps for displacement relative to said elevator when the elevator moves downwardly relative to the clamps and clamped articles at a time when they are prevented from moving further downwardly, and clamp operating means for driving said laterally movable clamp between a retracted position clear of articles on said plate and a clamping position wherein said clamp transversely compacts a layer of articles, control means for actuating said clamp operating means to drive said laterally movable clamp to said clamping position before said second drive means moves said plate to retracted position; and means for actuating said clamp operating means to move said laterally movable clamp to retracted position in response to said displacement of one of said clamps relative to said elevator.

6. The invention defined in claim 5 wherein said means mounting at least one of said clamps for displacement relative to the elevator comprises a pivot mounting said clamp operating means for pivotal movement relative to said elevator, and said clamp operating means comprises a piston and cylinder assembly connecting the elevator with said laterally movable clamp.

7. A method of stacking successive layers of articles into a multilayer stack employing a horizontal elongate rectangular elevator mounted for vertical movement from and to a lowered rest position, a horizontally disposed transfer plate mounted on said elevator for forward and rearward movement longitudinally upon said elevator between a retracted position at the rearward end of said elevator and an extended position at the forward end of said elevator, a stripper mounted on said elevator operable in a projected position to strip a layer of articles from said plate upon rearward movement of said plate from said extended position to said retracted position and operable in an inactive position to accommodate unobstructed movement of a layer of articles carried on said plate, and a stacking table having a stacking surface adapted to support a stack of articles located at substantially the level of said plate when said elevator is at its rest position, the stacking surface being located to underlie said plate when said elevator is elevated from said rest position and said plate is in its extended position; the steps of (a) accumulating a layer of articles on said plate when said plate is in retracted position, (b) moving the plate and layer to the extended position, movement of the transfer plate removing a previously completed stack from the stacking surface at the time the layer is being moved over on the transfer plate, (c) raising the stripper from retracted to an extended position in which it blocks the return of said layer of articles on said plate, (d) returning the plate beneath the stripper to deposit the layer on the stacking surface, (e) lowering the stripper below the path of movement of the plate, (f) relatively vertically moving the elevator and stacking surface to dispose the plate at a level slightly above the layer deposited, and (g) repeating steps a–e to deposit a second layer of articles on the first layer.

8. The method defined in claim 7 wherein the layer is clamped from opposite sides at the time the transfer plate is retracting.

9. The method of claim 8 in which the layer is unclamped in response to predetermined lowering of the elevator.

10. In an apparatus for stacking successive layers of articles into a multilayer stack including a fixed frame, a horizontally elongate elevator, first drive means for driving said elevator in vertical movement on said fixed frame from and to a lowered position, a horizontally disposed planar transfer plate mounted on said elevator for forward and rearward movement longitudinally upon said elevator between a retracted position at the rearward end of said elevator and an extended position at the forward end of said elevator, second drive means for driving said plate in a path of movement between said retracted and extended positions, a stripper member mounted on said elevator operable in a projected position to strip a layer of articles from said plate upon rearward movement of said plate from said extended position to said retracted position and operable in an inactive position to accommodate unobstructed movement of a layer of articles carried on said plate, third drive means for moving said stripper member between said projected position and said inactive position, and a stacking table on said frame having a stacking surface adapted to support a stack of articles located at substantially the level of said plate when said elevator is at its lowered position, the improvement wherein said stacking surface is located to underlie a front portion of said elevator and to underlie said plate when said plate is in its extended position; said stripper member is generally longitudinally intermediate said elevator and disposed below the path of movement of said plate when in inactive position, but is raised slightly above the path of movement of said plate when said stripper member is moved to a projected position, and wherein said plate is of a length less than half of the elevator and the plate's longitudinal path of movement such that when in forward position the rear edge of the plate is forward of the projected position of said stripper member.

11. The invention defined in claim 10 wherein said stripper member is mounted on said elevator for movement between said inactive and projected positions along a path which is inclined upwardly and forwardly of said elevator frame.

12. The invention of claim 10 wherein said transfer plate has a driven part for effecting its movement and such second drive means includes a rear member rearward of said stripper member for engaging therewith when the plate is in retracted position, and a forward member forward of the stripper member for engaging therewith when the plate is forward of the stripper member.

* * * * *